United States Patent [19]

Advolotkin et al.

[11] Patent Number: 4,472,650
[45] Date of Patent: Sep. 18, 1984

[54] ROTOR OF HIGH-SPEED ELECTRIC MACHINE

[76] Inventors: Nikolai P. Advolotkin, Petrodvorets, bulyar Krasnykh kursantov, 1, kv. 4; Nikolai I. Lebedev, ulitsa Sofiiskaya, 23, korpus 2, kv. 164; Igor E. Ovchinnikov, ulitsa Bela Kuna, 6, korpus 1, kv. 85, all of Leningrad, U.S.S.R.

[21] Appl. No.: 355,556

[22] PCT Filed: Jun. 26, 1980

[86] PCT No.: PCT/SU80/00110
§ 371 Date: Feb. 11, 1982
§ 102(e) Date: Feb. 11, 1982

[87] PCT Pub. No.: WO82/00069
PCT Pub. Date: Jan. 7, 1982

[51] Int. Cl.³ .......................................... H02K 21/12
[52] U.S. Cl. ................................... 310/156; 310/261; 335/272
[58] Field of Search ................ 310/262, 51, 156, 43, 310/112, 114, 263, 266, 261, 152, 153; 324/146; 335/272, 288

[56] References Cited

U.S. PATENT DOCUMENTS

| 2,579,318 | 12/1951 | Hershberger | 310/156 |
|---|---|---|---|
| 2,722,617 | 11/1955 | Cluwen | 310/156 |
| 3,032,670 | 5/1962 | Fritz | 310/263 |
| 3,466,476 | 9/1969 | Snowdon | 310/266 |
| 4,012,651 | 3/1977 | Burson | 310/156 |
| 4,095,129 | 6/1978 | Tanai | 310/156 |

FOREIGN PATENT DOCUMENTS

| 1285966 | 8/1972 | United Kingdom | 310/156 |
|---|---|---|---|
| 0560298 | 5/1977 | U.S.S.R. | 310/261 |
| 0708464 | 1/1980 | U.S.S.R. | 310/261 |

OTHER PUBLICATIONS

B. A. Balagurov et al.; Permanent-Magnet Electric Machine; p. 52, Publishing House "Energie"; 1964; Moscow, U.S.S.R.

Primary Examiner—R. Skudy
Attorney, Agent, or Firm—Lilling & Greenspan

[57] ABSTRACT

A rotor of a high-speed electric machine comprises a shaft 1, a magnetic ring 2 enclosing the shaft 1, a retaining ring 3, and permanent magnets 6 sisposed between the retaining ring 3 and the magnetic ring 2. The retaining ring 3 is secured to the shaft 1 by couplers, and a clearance 7 is provided between the permanent magnets 6 attached to the inside surface 5 of the retaining ring 3 and the magnetic ring 2.

2 Claims, 6 Drawing Figures

4,472,650

ROTOR OF HIGH-SPEED ELECTRIC MACHINE

FIELD OF THE INVENTION

The present invention relates to electromechanical engineering, and more particularly to rotors of high-speed electric machines.

The present invention can be most advantageously used in electric drives for centrifuges, high-pressure pumps and fans, machine tools, and other high-speed equipment.

BACKGROUND OF THE INVENTION

One urgent problem in development of high-speed electric machines is to increase their rotation speed, resulting in a smaller size and mass both of the machines and of the driving mechanisms, while keeping the machine power unaltered.

The rotation speed of high-speed electric machines is raised by increasing the rotor speed.

Rotors of the following types are used for high-speed electric machines:
rotors with laminated magnetic rings and windings;
rotors with solid magnetic rings and salient pole system (no windings);
rotors with smooth solid magnetic rings (no winding);
rotors with smooth solid magnetic rings, with permanent magnets (no windings).

A rotor with a laminated magnetic ring and a winding has the lowest strength leading to its limited use in high-speed electric machines, since high stresses developed by centrifugal forces exerted on the rotor in operation cause it to be rapidly destroyed.

The rotor with a solid magnetic ring with a salient pole system has significant losses (both electromagnetic and, particularly, aerodynamic) which are required to be minimized by evacuation of the cavity of a high-speed electric machine incorporating the rotor, thus considerably impairing the technological efficiency of the machine.

The rotor with a smooth solid magnetic ring is the most rugged of all the rotor types mentioned. This rotor, however, exhibits significant losses causing it to be severely heated, which brings about a sharp decrease in the efficiency of the high-speed electric machine in which it is employed, and hence lower machine power.

The rotor with a smooth solid magnetic ring with permanent magnets is somewhat inferior to the preceding one in its ruggedness. This rotor, however, offers great advantages over the other rotors, being essentially free from electromagnetic losses, and the magnetic flux of the permanent magnets obviates the need to consume the energy for electric machine excitation. As a result, the high-speed electric machines incorporating this rotor have a high efficiency. The high efficiency of the high-speed electric machine gives the advantage of smaller size of the rotor for machines of the same power and rotation speed, i.e. the rotor with permanent magnets will have a smaller size, and hence lower mechanical stresses.

In summary, rotors with a smooth solid magnetic ring are to be preferably used in high-speed electric machines.

Known is a rotor of a high-speed electric machine, comprising a shaft, a smooth solid magnetic ring fitted to the shaft, permanent magnets disposed around the magnetic ring, and a retaining ring fitted over the permanent magnets [V. A. Balagurov, F. F. Galteyev, A. N. Larionov, "Electricheskie mashiny s postojannymi magnitami" ("Electric machines with permanent magnets"), publication of 1964, Moscow, Energy Publishing House, p. 52].

The retaining ring, permanent magnets, and magnetic ring all arranged on the shaft in concentric relation to one another constitute a prestressed system due to pretensioning between the magnetic ring and the permanent magnets as well as between the permanent magnets and the retaining ring. As the rotor is operated, stresses caused by centrifugal forces are added to the stresses developed in its members as a result of pretensioning. These additional stresses are increased with an increase in the rotor speed, the maximum stresses occurring in the retaining ring which is farthest removed from the rotor axis. The tensile forces increase with an increase in the rotation speed of the rotor lower the pretension, and hence, the stress in the retaining ring determined thereby, cause the stresses to be redistributed [the stresses due to centrifugal forces are increased, while those due to the tension are decreased]. The residual tension defined as the difference between the pretensioning force and the tensile forces, with the rotation speed of the rotor held constant, should provide for the torque transfer from the shaft to the permanent magnets.

Therefore, with the rotation speed as large as possible for the particular rotor, the initial allowable stresses in the retaining ring consist of the stresses developed by centrifugal forces and the stresses determined by the minimum residual tension providing for the torque to be transferred from the shaft to the permanent magnets.

As a result, the stresses arising in the rotor, including those determined by the residual tension, impose limitations on the rotation speed of the rotor. Further, in this particular rotor, the minimum residual tension is actually selected so that a significant (e.g. twofold) margin is allowed to ensure reliable operation of the rotor, due to a number of manufacturing errors that manifest themselves especially when the rotor members are fabricated from heterogeneous materials, as well as due to arbitrary temperature-dependent deviations and the like.

An increase in the rotation speed of the rotor due to reduced stresses developed in the retaining ring and determined by the minimum residual tension providing the torque transfer from the shaft to the permanent magnets is obtained in the prototype high-speed electric machine (cf. British Pat. No. 1285966, published in 1972).

This rotor of a high-speed electric machine comprises a shaft, a smooth solid magnetic ring enclosing the shaft, permanent magnets secured to the magnetic ring by a thermoplastic compound, and a retaining ring fitted over the permanent magnets in a prestressed condition. The amount of pretensioning provided is somewhat reduced compared with the aforementioned prior art arrangement by virtue of using the thermoplastic compound.

As the rotor operates, the thermoplastic compound is heated as a result of aerodynamic losses, and its volume is increased.

The increase in the volume of the thermoplastic compound partly compensates various manufacturing errors, random temperature-dependent deviations, etc., making it possible to reduce the minimum residual tension margin down to 1.2–1.5, which in turn allows a decrease in the stresses determined by the residual tension with the consequent increase, to a certain extent, in the rotation speed of the rotor.

Similarly to the previous prior art arrangement, however, in this design, the rotation speed of the rotor is also limited by the stresses in the retaining ring including the stresses determined by the residual tension.

SUMMARY OF THE INVENTION

It is an object of the invention to provide a rotor of a high-speed electric machine with permanent magnets, wherein the retaining ring is secured to the shaft and the permanent magnets are so arranged around the magnetic ring as to enable the rotation speed to be increased by eliminating the stresses determined by the residual tension.

With this object in view, there is provided a rotor of a high-speed electric machine, comprising a shaft, a magnetic ring enclosing the shaft, a retaining ring, and permanent magnets disposed between the retaining ring and the magnetic ring, wherein, according to the invention, the retaining ring is secured to the shaft by means of couplers, a clearance being provided between the permanent magnets attached to the inside surface of the retaining ring and the magnetic ring.

The attachment of the retaining ring to the shaft by means of couplers and the provision of a clearance between the magnetic ring and the permanent magnets attached to the retaining ring permit a tension-free transfer of the torque from the shaft to the permanent magnets through the retaining ring, thus eliminating the stresses determined by the tension. In this case, the stresses arising in the retaining ring as the rotor is operated, result from the centrifugal forces alone. The smaller stresses in the retaining ring allow, in turn, an increase in the rotation speed of the rotor.

It is advisable that the magnetic ring and the permanent magnets be composed of individual sections spaced apart along the entire length of the rotor, the couplers for attachment of the retaining ring to the shaft being inserted between said sections.

The fact that the magnetic ring and the permanent magnets are composed of individual sections and the coupling members for coupling the retaining ring to the shaft are inserted between the sections allows a symmetrical arrangement of the structural members over the length of the rotor, thus avoiding the risk of rotor misalignment and of the bending moments exerted on the shaft and causing the rotor to vibrate, which results in a more reliable rotor and a greater ease of its assembly.

The couplers for attachment of the retaining ring to the shaft may be formed by disk-shaped links.

The couplers realized in the form of disk-shaped links feature a simpler process of fabrication.

The couplers for attachment of the retaining ring to the shaft may be formed by separate radially elastic ribs with a boss.

The couplers in the form of separate radially elastic ribs with a boss cause the tensile forces transferred from the boss to the retaining ring or from the retaining ring to the boss to be substantially reduced, thus minimizing the stresses developed in the retaining ring, and hence, enabling the rotor speed to be increased. The boss provided on the rib improves the accuracy of centering the retaining ring with respect to the shaft, resulting in a more reliable rotor.

BRIEF DESCRIPTION OF THE DRAWINGS

These and other advantages and features of the present invention will be more apparent from the following detailed description of the preferred embodiment of the invention taken in conjunction with the accompanying drawings, in which.

Figure 1:
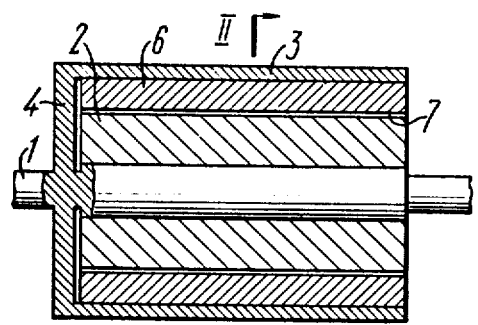
FIG. 1 shows a rotor of a high-speed electric machine, according to the present invention, viewed along a longitudinal section.

It will be noted that the accompanying drawings are schematic representations and are merely illustrative of the present invention, with no restrictions imposed on the dimensions of the members forming part of the proposed rotor, nor on the dimensional relationship between these members, etc.

The rotor of a high-speed electric machine comprises a shaft 1 (FIGS. 1, 2), a smooth solid magnetic ring 2 enclosing the shaft 1, and a retaining ring 3 fixed to the shaft 1 at the end of the rotor by means of a coupler in the form of a disk-shaped link 4. The disk-shaped link 4 is made integral with the retaining ring 3 and the shaft 1, which is a preferable design for small-size rotors. Other forms of couplers for attachment of the retaining ring to the shaft are also possible.

Secured to an inside surface 5 of the retaining ring 3, by a means such as adhesive, are permanent magnets 6 in the form of arcuate plates. The permanent magnets 6 are placed with a clearance 7 relative to the magnetic ring 2.

The width of the clearance 7 is so selected as to avoid mechanical interaction between the magnetic ring and the permanent magnets as they are mutually displaced during rotor assembly and operation.

According to one embodiment of the invention, the magnetic ring 2 (FIGS. 3, 4) and the permanent magnets 6 are composed of individual spaced-apart sections 8 arranged along the rotor. The couplers for attachment of the retaining ring 3 to the shaft 1, formed by disk-shaped links 4, are inserted between the sections 8 and rigidly connected to the shaft 1 and the retaining ring 3, e.g. by welding.

The number of sections 8 depends on the length of the working portion of the rotor: the longer the working portion of the rotor, the larger number of the sections 8 and the disk-shaped links 4 that are required to be provided.

Figure 5:
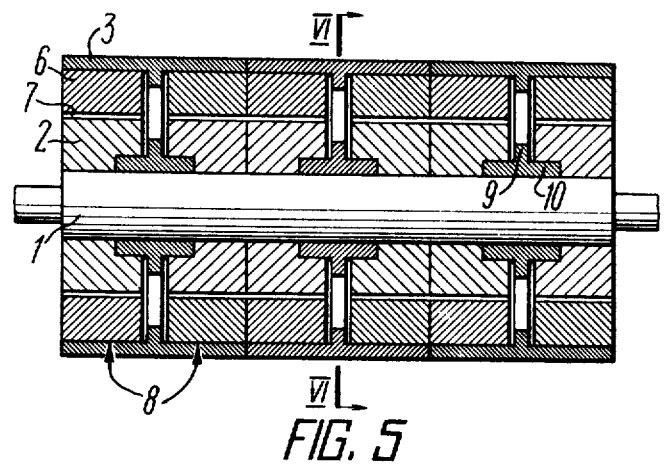
FIG. 5 represents an embodiment of the rotor of a high-speed electric machine with the magnetic ring and the permanent magnets composed of individual sections, and the couplers for attachment of the retaining ring to the shaft formed by radially elastic ribs with a boss.
Figure 6:
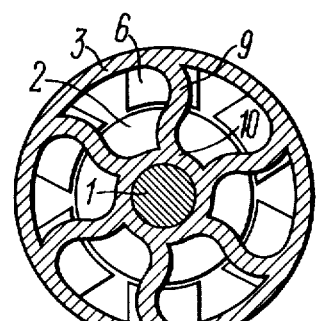
FIG. 6 is a section on VI—VI of FIG. 5.

FIGS. 5, 6 show another embodiment of the rotor, the identical members being designated by the same reference numerals as those in FIGS. 1–4.

In this embodiment of the invention, the rotor is made of a larger number of sections 8, and the couplers for attachment of the retaining ring 3 to the shaft 1 are formed by separate radially elastic ribs 9 with a boss 10.

Each radially elastic rib 9 has a zigzag configuration providing radial extension thereof, within the elastic region, by an amount substantially in excess of the difference between the inside diameter of the retaining ring 3 in the maximally stressed state and the inside diameter in the stressed state.

Therefore, the radially elastic ribs 9 bring about a significant reduction in the transfer of the tensile forces developed in the boss 10, as it is fitted over the shaft, to the retaining ring 3, and also the transfer of the stresses occurring in the retaining ring 3 to the boss 10, as the rotor is operated.

In the rotor of FIGS. 5, 6, the radially elastic ribs 9 are made integral with the retaining ring 3 and the boss 10.

The radially elastic ribs 9 may be rigidly secured to the boss 10 and the retaining ring 3 by an appropriate means such as welding.

Other embodiments of the radially elastic ribs are possible. For example, the radially elastic ribs may be formed by slots cut in the disk-shaped link.

By virtue of the couplers between the retaining ring and the shaft being secured to the boss, the accuracy of centering the retaining ring with respect to the shaft is increased, improving the reliability of the rotor.

Figure 3:
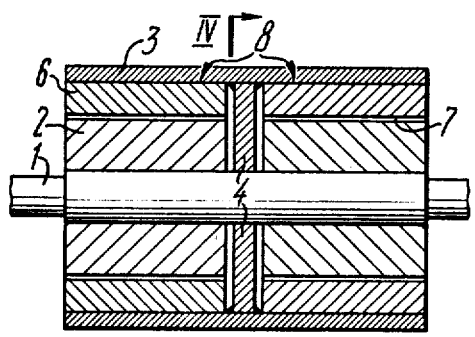
FIG. 3 represents an embodiment of the rotor of a high-speed electric machine with the magnetic ring and the permanent magnets composed of individual sections, and the couplers formed by a disk-shaped link, viewed along a longitudinal section.
Figure 4:
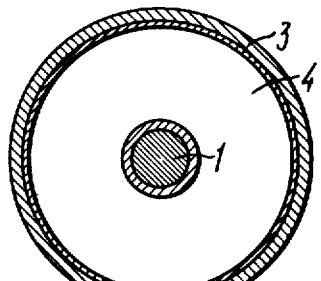
FIG. 4 is section taken along line IV—IV of FIG. 3.

Like the rotor of FIG. 3, in this particular rotor the number of sections 8 is dependent on the length of its working portion.

In the rotor with a long working portion, it is preferred that the retaining ring be formed by separate sections, resulting in an easier assembly of the rotor.

The sectional design of the magnetic ring 2 and the permanent magnets 6 as well as the provision of several couplers for attachment of the retaining ring 3 to the shaft 1 allows a symmetric distribution of the forces occurring in the structural members over the length of the rotor, thus making it more reliable. In addition, the multisection design of the structural members of the rotor enables the length of its working portion to be increased, which would be quite impracticable with the one-section members of the rotor.

The operation of the rotor of a high-speed electric machine now follows.

The driving machine (not shown) generates a torque on the shaft 1 (FIG. 1) of the rotor which is transferred, through the disk-like link 4, to the retaining ring 3 and the permanent magnets 6 secured to the retaining ring 3. A magnetic field is developed by the magnetic ring 2 and the permanent magnets 6, as they are rotated.

During operation of the rotor, stresses are developed in its structural parts that are due to centrifugal forces growing as the distance from the rotor axis is increased and tending to stretch the rotor members. The warranted clearance 7 between the permanent magnets 6 and the magnetic ring 2 eliminates mechanical interaction of the magnetic ring 2, as it is extended, with the permanent magnets 6.

However, the attachment of the retaining ring 3 to the shaft 1 by means of the link 4 at the end of the rotor prevents the retaining ring 3 from being extended at the joint, resulting in nonuniform extension of the retaining ring 3 and the permanent magnets 6. This in turn may bring about some unbalance and vibration of the rotor, the amount of unbalance and vibration increasing as the length of the rotor is increased.

The amount of unbalance and vibration as well as nonuniform extension of the retaining ring 3 (FIG. 3) can be minimized by having the magnetic ring 2 and the permanent magnets 6 made from separate sections 8, the disk-shaped links 4 being inserted therebetween.

Figure 2:
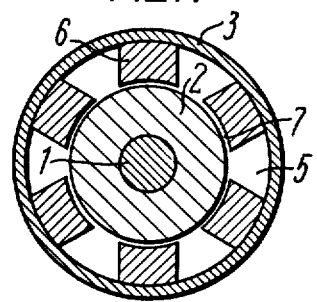
FIG. 2 is a section taken along line II—II of FIG. 1.

Both in the rotor of FIG. 1 and in the rotor of FIG. 3, forces are transmitted from the retaining ring 3 through the disk-shaped link 4 to the point at which it is joined to the shaft 1, which forces may cause the shaft 1 to be disconnected from the disk-shaped link 4 and the rotor to be made inoperative.

If the retaining ring 3 (FIG. 5) is secured to the shaft 1 by the radially elastic ribs 9, the transfer of the tensile forces from the retaining ring 3 to the boss 10 is substantially reduced. This may be accounted for by the fact that the radial forces applied to the ribs 9 cause bending forces to be developed therein, these latter forces tending to straighten the ribs. In this case, the straightening of the ribs involves much lower forces compared to those causing the ribs to extend. The stresses developed in the retaining ring 3 and the boss 10 are virtually unaffected by the forces causing the ribs to be straightened, since the extension of the ribs, as they are straightened, is not in excess of the increase in the diameter of the retaining ring 3 due to centrifugal forces.

Thus the attachment of the retaining ring 3 to the shaft 1 by couplers in the form of the radially elastic ribs 9 with the boss 10 permits a reduced transfer of the stresses from the boss 10 to the retaining ring 3 and from the retaining ring 3 to the boss 10, thus increasing the rotor speed.

The proposed construction of the rotor of a high-speed electric machine enables the stresses due to the tensioning to be eliminated, reducing the stresses developed in the retaining ring, and therefore, increasing the rotor speed.

INDUSTRIAL APPLICABILITY

The present invention can be most successfully used in electric drives for centrifuges, high-pressure pumps and fans, machine tools, and other high-speed machines.

We claim:

1. A rotor of a high-speed electric machine, comprising:
    a shaft,
    a magnetic ring enclosing said shaft,
    a retaining ring embracing said magnetic ring within its inside surface,
    couplers connecting said retaining ring to said shaft, and
    permanent magnets secured to said retaining ring and positioned in the space defined by said retaining ring and said magnetic ring with a clearance from said magnetic ring, wherein said couplers connecting said retaining ring to said shaft are made in the form of separate radially elastic ribs with a boss.

2. A rotor of a high-speed electric machine, comprising:
    a shaft,
    a magnetic ring enclosing said shaft,
    a retaining ring embracing said magnetic ring within its inside surface,
    couplers connecting said retaining ring to said shaft, and
    permanent magnets secured to said retaining ring and positioned in the space defined by said retaining ring and said magnetic ring with a clearance from said magnetic ring, wherein said magnetic ring and said permanent magnets are made from individual sections spaced apart along the length of the rotor, and wherein said couplers connecting said retaining ring to said shaft are made in the form of separate radially elastic ribs with a boss.

* * * * *